United States Patent [19]

Karnes et al.

[11] 4,423,596

[45] Jan. 3, 1984

[54] THERMAL ENGINE

[76] Inventors: Thomas E. Karnes, 4529 18th St.;
Robert J. Trupin, 468 Elizabeth St.,
both of San Francisco, Calif. 94114

[21] Appl. No.: 334,728

[22] Filed: Dec. 28, 1981

[51] Int. Cl.³ .............................................. F03G 7/06
[52] U.S. Cl. .......................................... 60/527; 60/529
[58] Field of Search .................................. 60/527, 529

[56] References Cited

U.S. PATENT DOCUMENTS 3,937,019 2/1979 Renner .................................. 60/527
4,325,217 4/1982 Golestaneh ........................... 60/527

Primary Examiner—Allen M. Ostrager
Assistant Examiner—P. Loiacano
Attorney, Agent, or Firm—Bruce & McCoy

[57] ABSTRACT

A thermal engine utilizing a strip of nitinol material or other thermally responsive shape memory effect material to drive a reciprocating output shaft, said strip of material forming a common wall between two different alternating temperature sources which thermally cycle the material.

12 Claims, 6 Drawing Figures

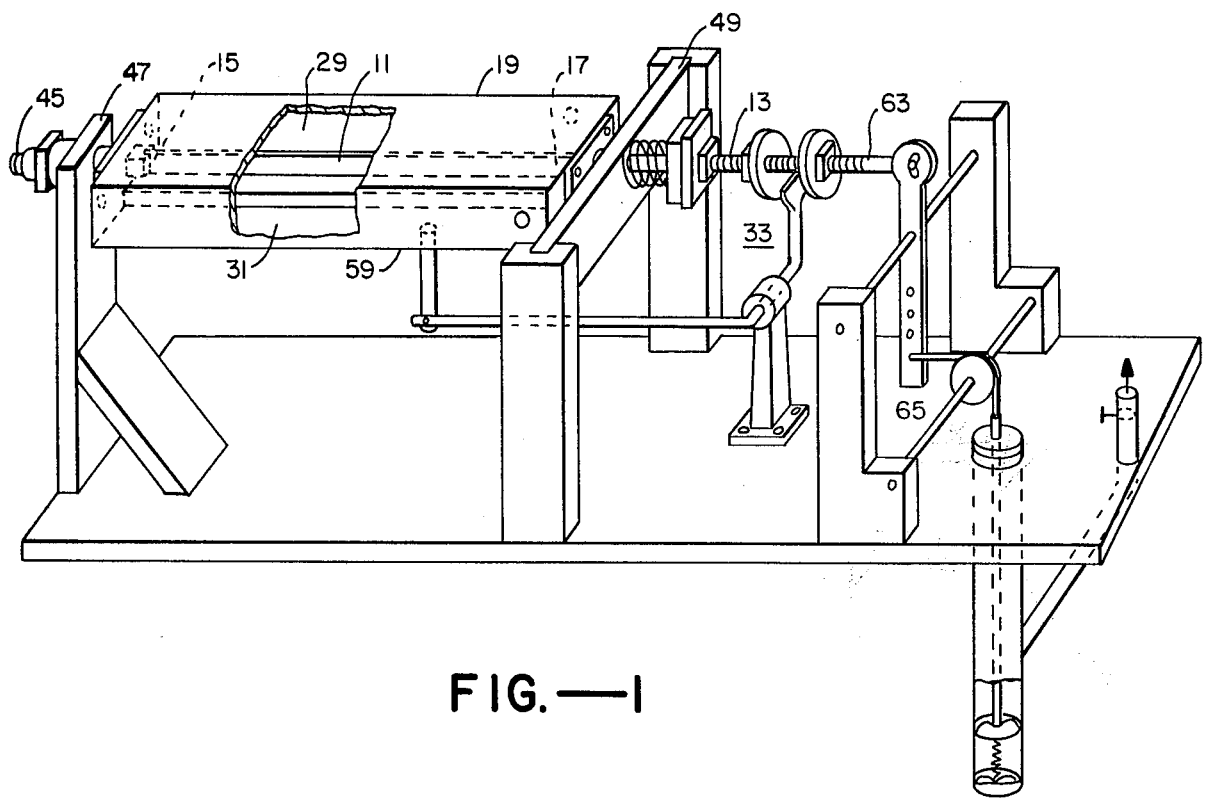
FIG.—1
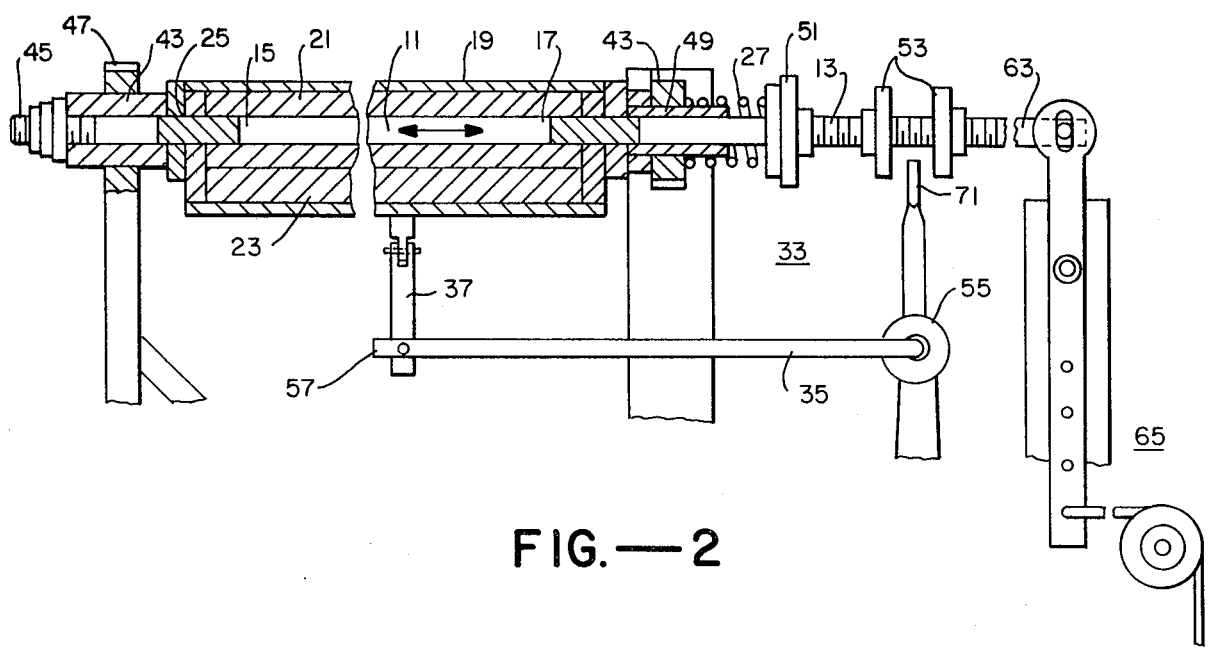
FIG.—2

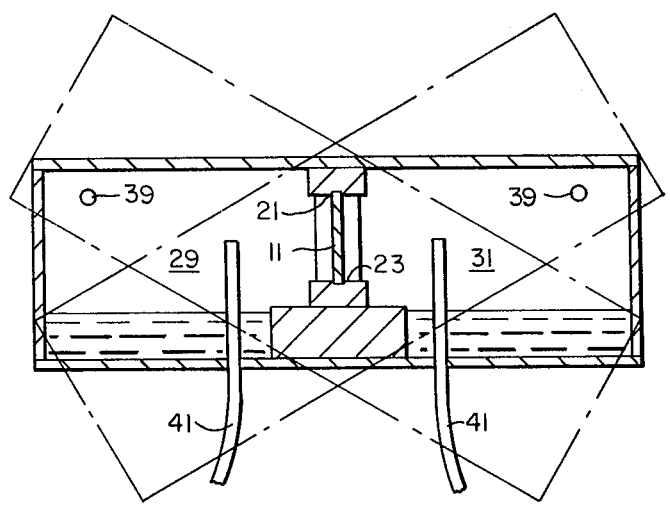
FIG.—3
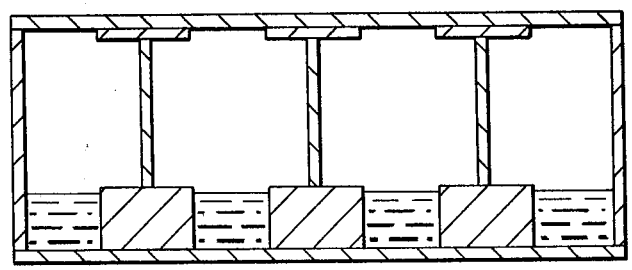
FIG.—6

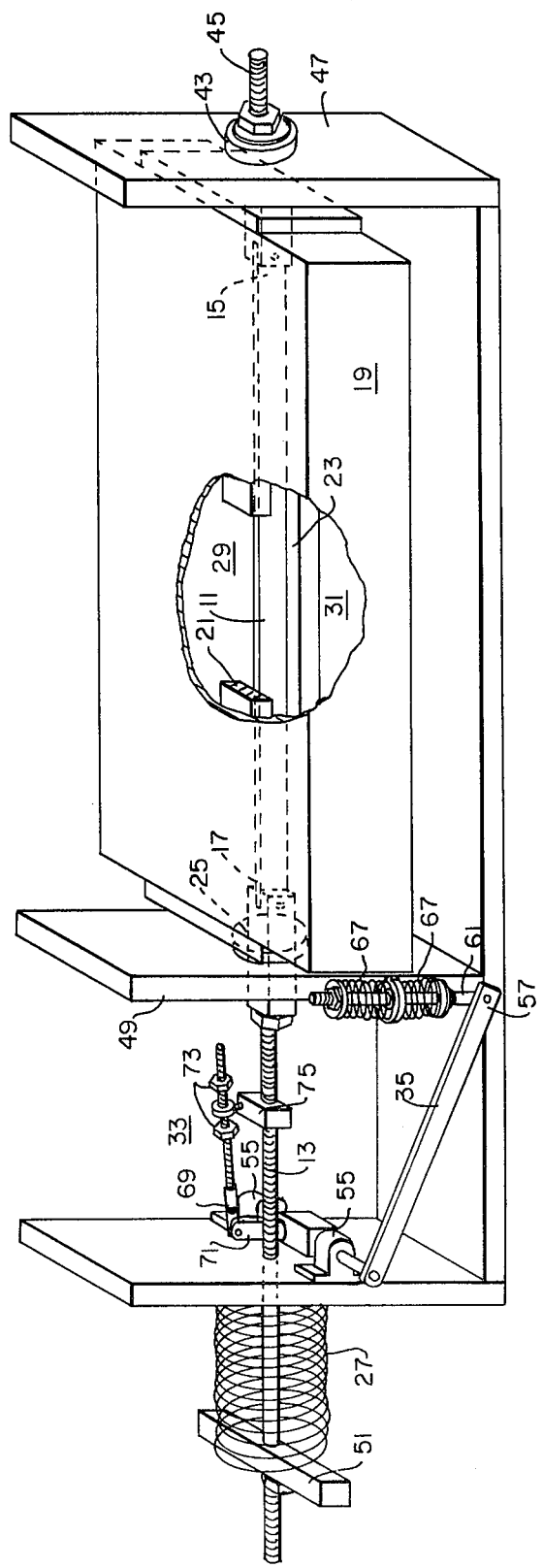
FIG.—4

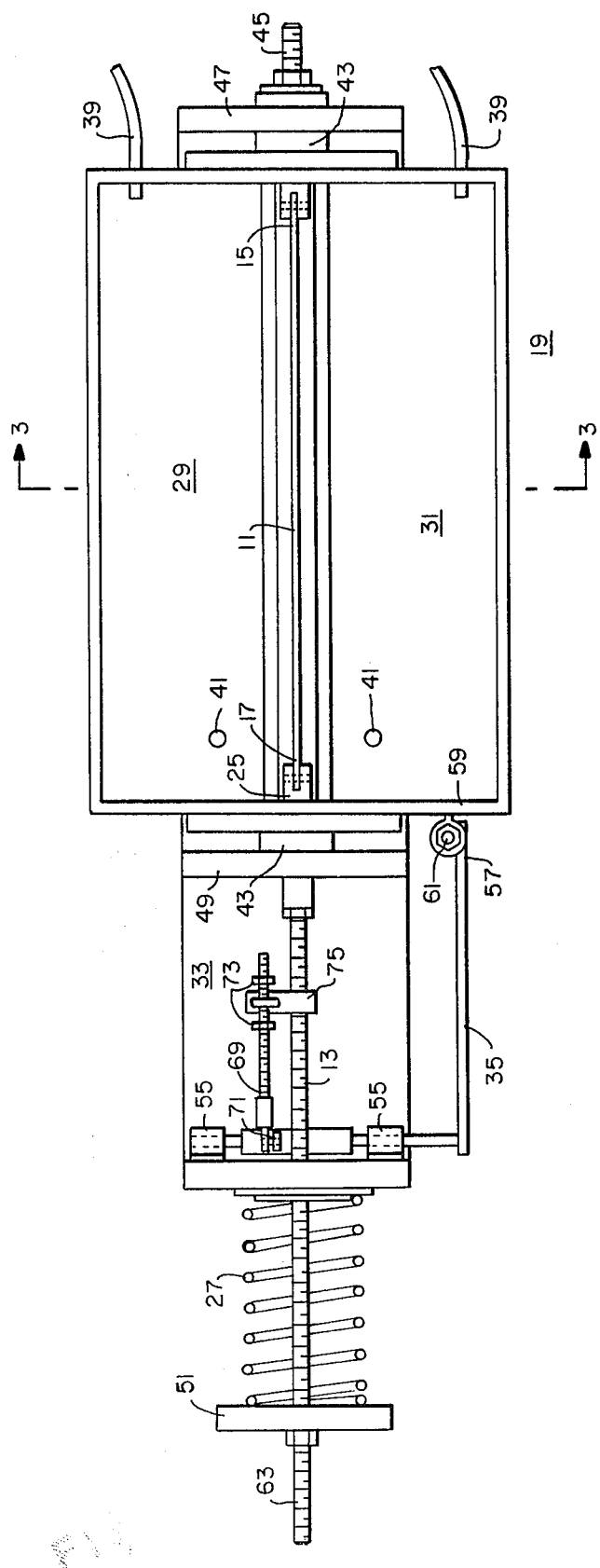
FIG.—5

THERMAL ENGINE

BACKGROUND OF THE INVENTION

1. Field of the Invention

The present invention relates to thermal engines and more particularly to nitinol or other thermally responsive shape memory effect material powered heat engines.

1. Description of the Prior Art

The earliest known nitinol heat engine is described in U.S. Pat. No. 3,913,326 for Energy Conservation Systems issued Oct. 21, 1975, to Ridgway M. Banks.

The "Background of the Invention" section of that patent sets forth in part the status of the prior art at the time of that invention. The "Summary of the Invention" section of that patent describes the thermodynamic working material as a thermally responsive memory material, such as nitinol, which is used to power the present invention. The material has also been described interchangeably as a thermal memory material or shape memory material. Published literature concerning nitinol is set forth in *Source Manual of Information on Nitinol and Niti* by Goldstein, Naval Surface and Weapons Center (1980).

A summary of the state of the art as of the end of 1978 is set forth in an article by William S. Ginell, Joseph L. McNichols, Jr. and John S. Cory, published in the May 1979 issue of Mechanical Engineering Magazine at page 28 entitled "Nitinol Heat Engines for Low Grade Thermal Energy Conversion". A subsequent article in the November 1979 issue of Scientific American magazine by Schetky, "Shape-Memory Alloys", points out the deficiencies of the known nitinol engines. Subsequent to these articles, a further U.S. Pat. No. 4,257,231 issued to Ridgway M. Banks on Mar. 24, 1981, for a Heat Engine.

One of the most prevalent problems in the thermal engines of the prior art is the contamination and degradation of the heat sources which occurs as a result of their inherent design. This occurs when the thermally responsive shape memory material is cycled between the heat source and the heat sink to cause the characteristic transition in the material. In almost every known prior art design, the thermal memory material is alternately immersed in a heat source and then in a heat sink. Some liquid is thereby always carried over between the heat source and the sink causing contamination as well as temperature degradation of both liquids. This can be very disadvantageous in the typical situations where the high heat source is a corrosive or contaminated liquid, such as steam from a natural hot spring or a radioactive effluent, and the cold heat sink is clean water. By eliminating carryover and thermal pollution of the liquids, the temperature differentials are more perfectly preserved and contamination is prevented.

None of the prior art devices have the capability of preventing carryover and degradation or contamination of the high and low temperature heat sources. The present invention provides a solution to this problem in a new and unique manner.

SUMMARY OF THE INVENTION

The present invention is a thermal engine which utilizes an elongated strip of thermally responsive shape memory effect material. One end of the strip is secured to a reciprocating output shaft and the other end is fixed against movement. Alternatively, both ends of the strip can be made movable by attaching each end of the thermal memory material to a reciprocating output shaft so that each end becomes a mirror machine of the opposite end and the middle of the memory material does not move. The middle then in effect becomes the end fixed against movement of ½ of the machine. For practical purposes only ½ of the mirror machine is described and claimed with it being understood that a mirror machine with both ends secured to reciprocating output shafts is simply two machines secured end to end.

The thermally responsive shape memory material has the memory property characteristic of shortening and lengthening when thermally cycled above and below its transition temperatures, that is, when it is alternately subjected to fluids at temperatures above and below its transition temperatures. When the strip is thermally cycled to shorten, it exerts a harnassable contracting force. When it is thermally cycled to lengthen, it becomes more elastic and in their configurations simply goes limp or slack. The lengthening and shortening of the strip due to thermal cycling causes the output shaft to reciprocate longitudinally.

A means is provided by the present invention for concurrently absorbing and partially storing and partially translating the energy developed during temperature induced longtudinal shortening of a strip of thermal memory material. In the preferred embodiment, the energy storage means is a spring connected to the output shaft. The spring is utilized to do work and to elongate and take up the slack in the strip of thermal memory material when it is thermally cycled to elongate.

A means is provided for thermally cycling the thermal memory strip by alternately applying different temperature fluids to the opposite sides of the strip. This means for thermally cycling the thermal memory material is driven by both the means for translating a portion of the energy developed by the longitudinal shortening of the thermal memory material and by the energy storage means.

A means is provided which is secured to the reciprocating output shaft for utilizing the energy developed and not stored or translated during the longitudinal shortening of the thermal memory material.

In a preferred embodiment where the strip of shape memory material is nitinol, it is utilized to form a wall or seal between the two different temperature fluid sources which are liquids. The liquids are disposed in chambers separated by the strip of thermal memory material. The chambers are partially rotatable about a horizontal axis which is proximate the longitudinal axis of the thermal memory material whereby as the chambers are rotated in a first direction about the axis, the liquid in one of the chambers is rotated into contact with the strip and the liquid in the other chamber is rotated out of contact with the strip. As the chambers are rotated in a reverse direction about the longitudinal axis, the liquid in contact with the strip is rotated out of contact and the liquid in the other chamber which is out of contact with the strip is rotated into contact.

The means for partially translating the energy developed by the longitudinal shortening of the thermal memory material includes a mechanical interconnection between the reciprocating output shaft and the means for thermally cycling the strip. When the strip shortens, the output shaft is pulled inwards and thereby biasing (stretching or compressing) the spring, and the chambers containing the liquids are rotated to another position by the mechanical interconnection which changes the liquids contacting the strip and reverses the thermal cycle. When this thermal cycle occurs, the strip elongates, and a portion of the energy stored in the spring is used to partially rotate the chambers in the reverse direction to the opposite position causing the liquid in the other chamber to thermally cycle the nitinol to shorten again. Thus, the spring partially powers the thermal cycling of the thermal memory material.

The present invention also contemplates a new and unique method of extracting power from a thermally responsive shape memory material in the form of an elongated strip of material. It comprises disposing the strip of material as a common wall between a pair of parallel elongated chambers each of which contains a different temperature liquid and then alternately partially rotating (rocking) the chambers around a horizontal axis disposed in the longitudinal plane of the strip of the material to alternately move the different temperature liquids into contact with the strip (which causes the strip to alternately shorten and elongate). The next step is to absorb and store at least a portion of the energy developed by the shortening of the strip. Concurrently a portion of the energy developed by the shortening of the strip is translated into a motion which reverses the rotation of the chambers about the horizontal axis whereby the other temperature liquid is rotated into contact with the strip causing the strip to elongate while the contacting liquid which caused the shortening is simultaneously moved out of contact with the strip. At least a portion if not all of the stored energy is employed to keep the strip in tension as it elongates and to reverse the rotation of the chambers.

The output of the machine is utilized by harnessing the excess energy developed during the shortening of the strip (and not stored or translated) to do work.

The present invention further contemplates cascading the high temperature fluid source used to thermally cycle the material to activate a multiple of thermally responsive shape memory material strips in a single machine to multiply the energy output and efficiency extracted from a temperature difference between fluids where that difference exceeds the temperature difference needed to thermally cycle a single strip of material.

DESCRIPTION OF THE DRAWINGS

FIG. 1 is a perspective view of a preferred embodiment of the thermal engine of this invention;

FIG. 2 is a side elevation view in section of the embodiment of FIG. 1;

FIG. 3 is a cross-sectional view of the embodiment of FIG. 4 taken along lines 3—3 of FIG. 5;

FIG. 4 is a perspective view of an alternative embodiment of the present invention;

FIG. 5 is a top plan view of the embodiment of FIG. 4; and

FIG. 6 is a cross-sectional view of an alternative chamber arrangement of the present invention taken at a position similar to lines 3—3 of FIG. 5.

OBJECTS OF THE INVENTION

It is therefore an important object of the present invention to provide a thermal engine which can utilize a strip of thermally responsive shape memory material such as nitinol as an energy converter.

It is another object of the present invention to utilize the thermally responsive shape memory material as a seal between the different temperature sources and to prevent contamination and degradation of one source by the other source (except for conductive heat transfer) which is occasioned by the raising and lowering of the temperature of the material itself.

It is also an object of the present invention to provide a nitinol heat engine which utilizes a portion of the energy developed by the engine to effect the alternate bathing of the thermally responsive shape memory material with different temperature baths.

It is a further object of the present invention to utilize a portion of the energy developed by the shortening of the memory material to elongate the same when it is thermally cycled to elongate.

It is yet another object of the present invention to provide a memory material powered heat engine in which the high temperature heat source can be cascaded in the same device to multiply the energy output and efficiency and to utilize the same volume of high temperature source for driving the machine and extracting a maximum of energy from a multiple of memory material strips.

And it is still a further object of the present invention to provide a nitinol engine which generates a reciprocating motion which can be directly harnessed (or stored in a spring or a flywheel) to provide useful energy.

Other objects of the present invention will become apparent when the Description of the Preferred Embodiment is considered in conjunction with the accompanying drawings.

DESCRIPTION OF THE PREFERRED EMBODIMENT

The present invention is designed to extract energy or work from shape memory alloys and particularly from thermally responsive shape memory effect materials which have a thermal memory and change shape at particular transition temperatures. The material which has been utilized in the present invention is nitinol, a nickel titanium alloy which possesses a temperature dependent shape memory effect. Since the upper temperature of phase transformation of most nitinol alloys occurs at relatively low temperatures ($-50°$ to $170°$ C.), low grade heat sources can be utilized to effect the shape change for extracting mechanical energy from the nitinol.

The thermal engine of the present invention utilizes the deformability of nitinol when it is cold (the nitinol is deformed by stretching the cold alloy to elongate it), and its reversion to its original shape (when the alloy is heated to above its transition temperature it returns to its original length) as the power source for the engine. Repetitive thermal cycling causes the strip of material to alternately elongate and shorten. Thermal cycling over a period of time also trains the alloy to change shape repetitively and accurately with smaller temperature differentials.

One of the essential characteristics of the present invention is that the thermal memory material is a thin strip of metal which has a large surface area relative to its thickness. Because of this, the different temperature media which are utilized to thermally cycle the material have a large surface area of relatively thin material to act upon. As a result, the heating and cooling causing the transformations are achieved relatively quickly and uniformly throughout the material. This physical arrangement of the working material in a thin elongated strip also permits it to form and act as a seal between the two different temperature sources which are used to thermally cycle the material.

A most important advantage of utilizing the thermal memory material as a seal between the two different temperature sources is that it prevents thermal pollution (degradation) and contamination between the two temperature sources. This is especially important in those applications of the invention where the high temperature source is a medium which cannot be mixed with the low temperature sink, such as a radioactive effluent from a nuclear reactor or a corrosive liquid such as sulfurous water from a hot spring or some other deleterious discharge from a heat source such as contaminated cooling water from a factory. The most likely low temperature source will be clean water or some other lower temperature medium which cannot be mixed with the high temperature source. No other prior art engine making use of nitinol has this unique characteristic of preventing contamination of one temperature source by the other.

Referring to the figures, the present invention utilizes an elongated strip 11 of thermally responsive shape memory effect material, such as nitinol, secured at one end to an output shaft 13 and fixed at the other end 15 against movement. The end 15 which is fixed against movement simply restrains the thermal memory material from moving during thermal cycling, but it can be attached to a movable anchor such as a threaded shaft (shown in FIGS. 1 and 2) and moved in small increments in order to adjust the positioning of the working end 17 of the elongated strip. As the thermal memory material is alternately shortened and lengthened by thermal cycling, the output shaft 13 reciprocates back and forth in a straight line while being rotated by the chambers 19.

The strip which forms a wall or seal between two different temperature fluids is provided with slidable seals 21, 23 along its top and bottom edges which prevent transfer or leaking of fluid from one chamber to the other. A similar seal 25 is also provided at the working end 17 of the strip which is connected to the output shaft 13 to prevent fluid from escaping from the ends of the chambers 19 as well as between the chambers.

A means is provided for concurrently absorbing and partially storing and partially translating the energy developed by the longitudinal shortening of the strip of thermal memory material. The energy storage means is utilized for two purposes: partly it is used to effect elongation of the strip of thermal memory material when it is thermally cycled to elongate, and partly it is used to help effect the thermal cycling of the material. In the preferred embodiment, this means for concurrently absorbing and partially storing energy includes a spring 27 which is interconnected to the reciprocating output shaft 13 of the device. It could also be a flywheel which is interconnected to the output shaft which would store kinetic energy. As the thermal memory strip shortens, the spring 27 is biased and potential energy is stored until it is needed to both elongate the strip and to provide energy for the means next described.

A means is provided for thermally cycling the thermal memory material by applying different temperature fluids to opposite sides of the strip. This thermal cycling means is driven both by the means which translates the energy and the means which stores a portion of the energy developed by the longitudinal shortening of the memory strip. In the preferred embodiment, the different temperature fluids are liquids that are contained in parallel chambers 29, 31 which are disposed on opposite sides of the thermal memory strip. It is contemplated that heated gases and ambient air can also be employed as the different temperature heat sources to effect the thermal cycling by alternately pumping them into and out of the chambers 29, 31.

The chambers 19 are partially rotatable on a horizontal axis proximate the longitudinal axis of the strip 11 whereby when the chambers are rotated in a first direction about the axis, the liquid in one of the chambers is rotated into contact with the strip and the liquid in the other chamber is rotated out of contact with the strip. As the chambers are rotated in the reverse direction around the longitudinal axis, the liquid then in contact with the strip is rotated out of contact while the liquid out of contact with the strip is rotated into contact. It is also possible to maintain the chambers horizontal and simply alternately raise and lower the liquid levels in the chambers.

The means which thermally cycles the thermal memory material is powered by the means which partially stores and partially translates the energy developed by the shortening of the strip of material. To effect this powering, the means for partially translating some of the energy developed by the longitudinal shortening of the thermal memory material includes a mechanical interconnection 33 between the reciprocating output shaft and the means for thermally cycling the strip. As the strip shortens, the output shaft 13 moves in a first direction (inward) and actuates the means for thermally cycling the material through the mechanical interconnection 33 to reverse the thermal cycle. Then, as the thermal cycle reverses and the strip is elongated, the output shaft is moved in a reverse direction (outward) by the means for partially storing some of the energy. The reverse travel in turn actuates the thermal cycle for shortening the strip through the same mechanical interconnection. The mechanical interconnection between the output shaft and said chambers causes the chambers to alternately partially rotate one way and then the other about the horizontal longitudinal axis as the output shaft reciprocates back and forth. This mechanical interconnection in FIG. 1 is a force direction changing bellcrank 35 and connecting rod 37.

Thus, as a result of the interconnection between the means for partially translating some of the energy developed by the longitudinal shortening of the thermal memory material and the means for thermally cycling the memory material, the device is self-timing for effecting the thermal cycling. Movement of the output shaft in response to the lengthening and shortening of the thermal memory material actuates the thermal cycling through the mechanical interconnection. This self-timing is an important feature of the invention because irrespective of the speed at which the machine operates, the thermal cycling is automatically actuated to elongate and shorten the thermal memory material and the machine continues its operation so long as the temperature differential is provided to the strip.

A simplified working embodiment of the invention is shown in FIG. 1 of the drawings. Shown therein is a fluid container which is divided into two chambers 29, 31 by the nitinol strip 11. The chambers must be furnished with continuously replenished supplies of the different temperature fluids. This is done by means of flexible hoses 39 which are secured by fittings to the chambers which are provided with overflow standpipe outlet drains 41 which maintain the liquid level at the desired height throughout the chambers. The flexible hoses accommodate the rocking movement of the chambers 19 (hoses not shown in FIGS. 1 and 2).

The container for the chambers 19 is journalled 43 at opposite ends so that it can be rotated about an axis disposed proximate the longitudinal axis of the strip of thermal memory material disposed in the container between the two chambers. The end of the strip 15 which is secured against movement is secured to a shaft 45 which is journalled in a support 47. The journal shaft 45 is threaded on its free end so that it can be adjusted longitudinally with respect to the chambers for adjusting the positioning of the strip of material within the container. The strip is provided with seals 21, 23 along its top and bottom edges to permit it to exit the container and be attached to the journal shaft without permitting leakage of the fluids disposed in the chambers.

The output end 17 of the strip of thermal memory material which is connected to the output shaft or the output shaft itself is also provided with a seal 25 to permit the strip or the shaft to exit the container. The output shaft is also journalled similar to the opposite end to permit the rocking rotation of the container.

A spring 27 is disposed between the journal support 49 and a stop 51 on the output shaft whereby as the strip of thermal memory material shortens, the spring 27 is compressed or it just as effectively could be put in tension. As the thermal memory material goes slack, the spring reciprocates the output shaft to an extended position and keeps the strip taut.

The threaded output shaft 13 is also provided with a pair of adjustable stops 53 which bracket the input end of the bell crank. The bellcrank 35 is journalled 55 so that its output end 57 moves with an up and down motion which is transmitted to one edge 59 of the container 19 which holds the different temperature liquids through a connecting rod or a rigid link 61. The connecting rod causes the chambers to rock alternately clockwise and counter clockwise for a portion of a rotation around the longitudinal axis of the strip of thermal memory material. This alternating rotation causes first the liquid in one chamber and then the liquid in the other to inundate the thermal memory strip and to thermally cycle it.

A means is provided for utilizing the excess energy developed during the longitudinal shortening of the thermal memory material which is not stored or translated to do useful work. This can be done in two ways. In the first and preferred way as shown in FIG. 1, all of the excess energy developed during the shortening of the thermally responsive memory material (and not translated to rock the chambers to move the heat sink out of contact with the strip) is taken up and stored in the spring 27. Then as the strip elongates the energy stored in the spring is used to simultaneously stretch the strip, rock the chambers, and do work.

In the second preferred way, only a portion of the energy developed during the shortening of the thermally responsive memory material is taken up and stored in the spring: enough to stretch the strip and to rock the chambers to reverse the thermal cycle. The remaining energy is used to rock the chambers and to do work directly without first storing it in the spring. The advantage of the first method of work extraction is that if there is a mechanical hangup in the work output system, it only affects the spring and does not impose the load directly on the thermal memory material. A mechanical hangup in the second way of extracting work could impose the stress directly on the thermal memory material with a possible resulting failure.

The free end 63 of the output shaft can be interconnected to any energy utilizing apparatus, and FIG. 1 of the drawings shows it connected simply to a motion multiplier 65 for pumping water in a well. The nitinol shortens a small distance with great power, so a motion multiplier is generally needed to effectively extract useful motion from the thermal memory material. The arrangement of FIG. 1 causes the work to be done when the strip elongates.

FIG. 3 of the drawings shows an end elevation of the alternating rotational positions of the chambers 19 and it can be seen that as the chambers are rotated in a first direction, that the liquid which is in the chamber which is lifted by the rotation then flows down and covers the thermal memory strip while the liquid in the other chamber, which is lowered, falls away from the strip to the bottom corner of the chamber. As the motion is reversed, the respective positions of the liquids are also reversed.

FIGS. 4 and 5 show an alternative arrangement of the bell crank drive which has proven to be a more workable embodiment in actual practice than the conceptual arrangement shown in FIGS. 1 and 2. Springs 67 are provided on opposite sides of the sliding connection of the connecting rod 61 which links the bell crank 35 and the liquid container 19. The springs 67 absorb the rather quick physical response of the phase change of the thermal memory material, the shortening and lengthening, so that the momentum of the rocking mechanism does not overstress the nitinol strip 11 and permits absorption and conservation of the momentum which is stored as energy in the springs.

In the embodiment shown in FIGS. 4 and 5, a push rod 69 is connected between the input end 71 of the bell crank and the output shaft 13. One end of the push rod 69 is journalled to the bellcrank 35, and the other end is engaged with the output shaft by means of an adjustable connection. The push rod is threaded to permit stops 73 (in the form of double nuts) to be located along the push rod 69 for adjusting the timing of the machine. Similarly, the output shaft is threaded to allow the push rod actuator 75 to be adjustably located therealong. Once the stops and the actuator have been correctly located along the push rod and the output shaft to properly time the thermal cycling of the material, the timing is basically set for the entire speed range of operation of the machine. However, slight tuning for different set speeds does seem to improve performance.

FIG. 6 illustrates a container having multiple chambers 19 to employ the cascade effect in the invention. It is known that by altering the composition of the nitinol alloy with different percentages of composition that the upper temperature of transformation changes rather dramatically. With minute changes in material composition, it is contemplated that a series of alloys of nitinol can be developed with each having a different temperature of transformation. By arranging the alloys in descending order of temperature of transformation, it is possible to transfer heat from the higher temperature liquid from compartment to compartment to cycle all of the nitinol strips. This can be done in two ways: by routing the high temperature liquid from compartment to compartment or by having sealed intermediate compartments which contain a liquid that transmits the heat from one strip to the next. Thus, it is believed that the heat of a high temperature fluid can be successively reused for each different composition of thermal memory material alloy so that by using the different alloys of thermal memory material strips in the containers, and then permitting the heat of the high temperature fluid to cascade from chamber to chamber by rocking the container 19, to thereby thermally cycle a multiple of thermal memory strips from the same heat source, an even greater efficiency in extraction of energy can be developed.

It will be seen that the present invention accomplishes all of the advantages which have been attributed thereto, particularly that of preventing contamination of either the heat source or the heat sink by the other. This is true because there is no carryover from one to the other which occurs in all of the known prior art devices. A further advantage is obtained at this time over all of the known prior art for the reason that this is the first arrangement which uses nitinol in strips rather than thin wires for the extraction of energy whereby greater output forces are developed than have heretofore been obtained.

While the invention has been described in considerable detail in the foregoing description of the preferred embodiments, it is not to be limited to the terms set forth herein except as may be necessitated by the appended claims.

We claim:

1. A thermal engine comprising
   at least one elongated strip of thermally responsive shape memory material secured at one end to an output shaft and fixed at the other end against movement, said material having the memory characteristic of shortening and lengthening when thermally cycled to reciprocate said output shaft,
   means for concurrently absorbing and partially storing and partially translating the energy developed by the longitudinal shortening of the strip of thermal memory material, said energy storage means elongating said strip when it is thermally cycled to elongate,
   means for thermally cycling said thermal memory strip by alternately applying different temperature fluids to opposite sides of said strip in a manner so that the fluids do not intermix, said means being driven by the means for translating and storing a portion of the energy developed by the longitudinal shortening of the thermal memory strip, and
   means for utilizing the excess energy developed during the longitudinal shortening of the thermal memory material and not utilized to elongate the strip or to alternately apply different temperature fluids to opposite sides of the strip.

2. The thermal engine of claim 1 wherein the thermal memory material strip forms a wall between the different temperature fluid sources.

3. The thermal engine of claim 2 wherein the different temperature fluids are liquids that are contained in chambers disposed on opposite sides of said strip, said chambers being partially rotatable about a horizontal axis proximate the longitudinal axis of said strip whereby as the chambers are rotated in a first direction about said axis, the liquid in one of the chambers is rotated into contact with said strip and the liquid in the other chamber is rotated out of contact with the strip, and as said chambers are rotated in a reverse direction about the longitudinal axis, the liquid contact with the strip is reversed.

4. The thermal engine of claim 3 wherein at least a pair of thermal memory material strips are employed and are arranged as two opposing walls of a chamber containing one of the temperature sources for thermally cycling the strips, and the chambers for the other temperature sources are disposed on the opposite sides of the strips from the chamber disposed between the strips, and the longitudinal axis of rotation is proximate the center of the chambers between the strips.

5. The thermal engine of claim 1 wherein the means for concurrently absorbing and storing energy includes a spring interconnected to said reciprocating output shaft whereby as the thermal memory strip shortens, the spring is biased and energy is stored to elongate said strip when said strip is thermally cycled to cause said strip to elongate.

6. The thermal engine of claim 1 wherein the means for partially translating some of the energy developed by the longitudinal shortening of the thermal memory material includes an interconnection between said reciprocating output shaft and the means for thermally cycling said strip so that the shortening of the strip moves the output shaft in a first direction which in turn actuates the thermal cycle for elongating the strip and as the strip is elongated, the output shaft is moved in the reverse direction by the means for partially storing some of the energy which in turn actuates the other thermal cycle to shorten the strip.

7. The thermal engine of claim 1 wherein a multiplicity of thermal memory material strips having different temperatures of transition are employed and are arranged to thermally cycle synchronously and the same heat from the high temperature fluid source is cascaded from strip to strip to effect the thermal cycling of all of the strips.

8. A nitinol thermal engine comprising
   an elongated strip of nitinol material secured at one end to an output shaft and fixed at the other end against movement,
   a pair of chambers containing different temperature liquids disposed on opposite sides of said strip with said strip forming a common wall between said chambers, said chambers and said strip being partially rotatable in either direction about a horizontal axis disposed proximate the longitudinal axis of said strip,
   means for concurrently absorbing and partially storing and partially translating the energy developed by the longitudinal shortening of the strip, said energy storage means elongating said strip when it is thermally cycled to elongate,
   means for alternately rocking said chambers in opposite directions around said horizontal longitudinal axis to alternately apply the different temperature liquids to the opposite sides of said strip, said means including a mechanical interconnection between said reciprocating output shaft and said chambers for partially translating the shortening of said strip and transforming the stored energy into the alternate partial rotational motion of said chambers about said horizontal longitudinal axis,
   means secured to said output shaft for utilizing the excess energy developed during the longitudinal shortening of the nitinol material and not utilized to elongte the strip or to rotate the chambers.

9. The thermal energy engine of claim 8 wherein the means for concurrently absorbing and storing energy includes a spring interconnected to said output shaft whereby as the thermal memory strip shortens, the spring is biased and the energy is stored to elongate said strip and to provide energy to partially rotate said chambers when said strip is thermally cycled to cause said strip to elongate.

10. A nitinol thermal engine comprising a pair of parallel elongated chambers having a common wall and containing different temperature liquids, said chambers being journalled to permit partial rotation thereof about a horizontal longitudinal axis disposed in the plane of said common wall, a strip of nitinol material forming the common wall between said chambers, said strip being secured against movement at one end and secured to a reciprocable output shaft at the other end, a bell crank mechanically interconnecting said output shaft to said chambers whereby as said output shaft reciprocates, said chambers are alternately partially rotated one way and then the other about the horizontal longitudinal axis, a biased spring interconnected to said output shaft, and a means secured to said output shaft utilizing the excess energy developed by the thermal cycling of said nitinol and not stored in said spring to elongate the strip or used for effecting the oscillation of said chambers.

11. The method of extracting power from a strip of thermally responsive shape memory material comprising disposing the strip of material as a common wall between a pair of parallel elongated chambers containing different temperature liquids, alternately partially rotating the chambers around a horizontal axis disposed in the longitudinal plane of the strip of material to alternately place the different temperature liquids into alternating contact with said strip which causes said strip to alternately shorten and elongate, absorbing and storing a portion of the energy developed by the shortening of the strip to effect elongation of said strip when it is thermally cycled to elongate and to power a portion of the motion which thermally cycles said strip to shorten, translating a portion of the energy developed by the shortening of the strip into a motion which reverses the rotation of the chambers about the horizontal axis to bring the particular temperature liquid into contact with the strip which causes elongation thereof, harnessing the excess energy developed during the shortening of the strip (and not utilized to rotate the chambers or to elongate the strip) to do work, and repeating the cycle.

12. The method of claim 11 wherein a multiplicity of parallel chambers and thermally responsive shape memory material strips having different temperatures of transformation, and being arranged in descending order of temperature of transformation, are employed and the heat from the high temperature source is cascaded from strip to strip.

* * * * *